United States Patent
Lambert et al.

(10) Patent No.: US 10,515,025 B2
(45) Date of Patent: Dec. 24, 2019

(54) COMMUNICATION PROTOCOL ADAPTER

(71) Applicant: Cirrus Logic International Semiconductor Ltd., Edinburgh (GB)

(72) Inventors: Bradley Allan Lambert, Austin, TX (US); Michael A. Kost, Cedar Park, TX (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 15/662,777

(22) Filed: Jul. 28, 2017

(65) Prior Publication Data

US 2018/0039585 A1    Feb. 8, 2018

Related U.S. Application Data

(60) Provisional application No. 62/372,054, filed on Aug. 8, 2016.

(51) Int. Cl.
 *G06F 13/10* (2006.01)
 *G06F 13/42* (2006.01)

(52) U.S. Cl.
 CPC ........ *G06F 13/102* (2013.01); *G06F 13/4282* (2013.01)

(58) Field of Classification Search
 CPC .. G06F 13/102; G06F 13/385; G06F 13/4068; G06F 13/4081; G06F 13/409; G06F 13/4282; G06F 21/85

(Continued)

(56) References Cited

U.S. PATENT DOCUMENTS 5,875,310 A * 2/1999 Buckland ............ G06F 13/4081
 710/309
6,134,616 A * 10/2000 Beatty ...................... G06F 1/30
 710/104

(Continued)

FOREIGN PATENT DOCUMENTS

EP 2887225 A1 6/2015
HK 1109469 A 5/2011

OTHER PUBLICATIONS

Combined Search and Examination Report under Sections 17 and 18(3) of the UKIPO, Application No. GB1712655.8, dated Feb. 12, 2018.

(Continued)

*Primary Examiner* — Faisal M Zaman
(74) *Attorney, Agent, or Firm* — Jackson Walker L.L.P.

(57) ABSTRACT

In accordance with embodiments of the present disclosure, an adapter for different types of devices that are defined by a full set of capabilities for a communication protocol may include one or more ports, wherein each of the one or more ports is configured to receive one of the different types of devices, and a device controller communicatively coupled to the one or more ports. The device controller may be configured to, when one of the different types of devices is received by the one or more ports obtain information related to a detection of the one of the different types of devices and, based on the information related to the detection, expose a subset of capabilities from the full set of capabilities to a bus of the communication protocol, wherein the subset of capabilities is defined by the one of the different types of devices for the communication protocol.

30 Claims, 7 Drawing Sheets

(58) Field of Classification Search
USPC .......... 710/15, 302, 305, 313, 62, 63, 72, 8
See application file for complete search history.

(56) References Cited

U.S. PATENT DOCUMENTS

| | | | | |
|---|---|---|---|---|
| 6,233,641 | B1* | 5/2001 | Graham | G06F 13/4022 710/31 |
| 6,243,774 | B1* | 6/2001 | Eide | G06F 9/4411 710/302 |
| 6,775,714 | B1* | 8/2004 | Miyano | H04L 12/40052 370/431 |
| 8,631,167 | B2* | 1/2014 | Samura | G06F 13/385 710/10 |
| 8,751,721 | B2* | 6/2014 | Scales | G06F 13/426 710/313 |
| 8,843,688 | B2* | 9/2014 | Engebretsen | G06F 9/4411 710/316 |
| 2003/0217254 | A1* | 11/2003 | Page | G06F 8/60 713/2 |
| 2004/0221077 | A1* | 11/2004 | Yen | G06F 13/4072 710/100 |
| 2005/0044283 | A1* | 2/2005 | Muro | G06F 13/387 710/8 |
| 2005/0188097 | A1* | 8/2005 | Ichimura | H04L 12/40071 709/231 |
| 2005/0240695 | A1* | 10/2005 | Leaming | G06K 19/07 710/104 |
| 2006/0031624 | A1* | 2/2006 | Hong | H04N 5/765 710/313 |
| 2006/0045112 | A1* | 3/2006 | Laiho | G06F 1/1632 370/419 |
| 2006/0065743 | A1* | 3/2006 | Fruhauf | G06F 13/385 235/492 |
| 2006/0156348 | A1* | 7/2006 | Tanabe | G06F 13/387 725/74 |
| 2007/0079185 | A1* | 4/2007 | Totolos, Jr. | G06F 11/106 714/718 |
| 2007/0106916 | A1* | 5/2007 | Yanagawa | G06F 1/3203 713/300 |
| 2009/0011794 | A1* | 1/2009 | Seo | H04M 1/72527 455/557 |
| 2009/0210637 | A1* | 8/2009 | Yung | G06F 13/385 711/154 |
| 2010/0023649 | A1* | 1/2010 | Choi | G06F 13/385 710/14 |
| 2010/0100200 | A1* | 4/2010 | Kim | G06F 13/4022 700/12 |
| 2010/0115150 | A1* | 5/2010 | Hachiya | G06F 1/266 710/19 |
| 2010/0128900 | A1* | 5/2010 | Johnson | H03G 3/001 381/98 |
| 2011/0022737 | A1* | 1/2011 | Kono | G06F 13/385 710/5 |
| 2011/0225328 | A1* | 9/2011 | Ulenas | G06F 13/387 710/58 |
| 2012/0011286 | A1* | 1/2012 | Wong | H04B 10/40 710/14 |
| 2012/0030381 | A1* | 2/2012 | Singh | G06F 1/3206 710/16 |
| 2012/0042099 | A1* | 2/2012 | Wong | G06F 21/44 710/9 |
| 2012/0054378 | A1 | 3/2012 | Malamant et al. | |
| 2012/0117294 | A1* | 5/2012 | Jadus | G06F 13/4027 710/315 |
| 2013/0117489 | A1* | 5/2013 | Doshi | G06F 13/20 710/313 |
| 2013/0198535 | A1* | 8/2013 | Takashima | G06F 1/266 713/300 |
| 2014/0089532 | A1* | 3/2014 | Manor | G06F 11/0745 710/8 |
| 2014/0201401 | A1* | 7/2014 | Tokumitsu | G06F 13/36 710/104 |
| 2014/0344480 | A1* | 11/2014 | Borve | G06F 9/4411 710/8 |
| 2015/0186320 | A1* | 7/2015 | Jaussi | G06F 13/4068 710/305 |
| 2015/0227489 | A1* | 8/2015 | Chen | G06F 13/4291 710/313 |
| 2015/0370751 | A1* | 12/2015 | Perrine | G06F 13/4068 710/106 |
| 2016/0004658 | A1* | 1/2016 | Chen | G06F 13/404 710/313 |
| 2016/0100245 | A1* | 4/2016 | Nakayama | H04R 1/1041 381/74 |
| 2016/0112711 | A1 | 4/2016 | Hundal et al. | |
| 2016/0127671 | A1* | 5/2016 | Hundal | G06F 13/4247 348/723 |
| 2016/0179648 | A1 | 6/2016 | Srivastava et al. | |
| 2016/0306771 | A1 | 10/2016 | Chen et al. | |
| 2016/0328346 | A1* | 11/2016 | Van Der Zande | G06F 13/4291 |
| 2017/0280223 | A1* | 9/2017 | Cavarra | H04R 1/1041 |

OTHER PUBLICATIONS

International Search Report and Written Opinion of the International Searching Authority, International Application No. PCT/US2017/045710, dated Oct. 30, 2017.

* cited by examiner

COMMUNICATION PROTOCOL ADAPTER

RELATED APPLICATION

The present disclosure claims priority to U.S. Provisional Patent Application Ser. No. 62/372,054, filed Aug. 8, 2016, which is incorporated by reference herein in its entirety.

FIELD OF DISCLOSURE

The present disclosure relates in general to circuits for electronic devices, including without limitation audio devices, including personal audio devices such as wireless telephones and media players, and more specifically, to systems and methods relating to a communications device capable of presenting to a host device, in lieu of its full capabilities, the best or most appropriate set of capabilities based on one or more other devices coupled to the communications device.

BACKGROUND

In electronics and computing, a plug-and-play device or a plug-and-play interface protocol, is one with a specification that facilitates the discovery of a hardware component in a system without the need for physical device configuration or user intervention in resolving resource conflicts. Such plug-and-play devices may be used in connection with plug-and-play compatible computers, handheld devices, personal audio devices (e.g., wireless telephones, mobile/cellular telephones, cordless telephones, mp3 players, and other consumer audio devices), and other host devices.

A common feature of plug-and-play interface protocols (e.g., Universal Serial Bus (USB)) is the discovery of capabilities of an attached device by a host. As devices become more complex, presenting a full account of their capabilities presents several problems. First, a simple host may not have the ability to understand or process the complex set of full device capabilities. Second, a device may, by design or use, only support a subset of its full capabilities at any one time.

SUMMARY

In accordance with the teachings of the present disclosure, one or more disadvantages and problems associated with existing communication adapters may be reduced or eliminated.

In accordance with embodiments of the present disclosure, an adapter for different types of devices that are defined by a full set of capabilities for a communication protocol may include one or more ports, wherein each of the one or more ports is configured to receive one of the different types of devices, and a device controller communicatively coupled to the one or more ports. The device controller may be configured to, when one of the different types of devices is received by the one or more ports, obtain information related to a detection of the one of the different types of devices and, based on the information related to the detection, expose a subset of capabilities from the full set of capabilities to a bus of the communication protocol, wherein the subset of capabilities is defined by the one of the different types of devices for the communication protocol.

In accordance with these and other embodiments of the present disclosure, a method for use in an adapter for different types of devices that are defined by a full set of capabilities for a communication protocol is provided. The adapter may comprise one or more ports, wherein each of the one or more ports is configured to receive one of the different types of devices and the adapter comprises a device controller communicatively coupled to the one or more ports. The method may include, when one of the different types of devices is received by the one or more ports, obtaining information related to a detection of the one of the different types of devices and based on the information related to the detection, exposing a subset of capabilities from the full set of capabilities to a bus of the communication protocol, wherein the subset of capabilities is defined by the one of the different types of devices for the communication protocol.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In accordance with the present disclosure, methods and systems are provided in which, in lieu of its full capabilities, a device may present only the best or most appropriate set of capabilities to a host. This limiting of presenting capabilities by a device to a host may have the benefit of speeding discovery, simplifying the processing of capabilities by a host, and preventing erroneous use of currently unsupported capabilities.

Existing practice in the industry is for a device to present a single, fixed set of capabilities to a host without regard to their complexity or fitness for the current device configuration. The fixed set of capabilities is commonly called a device descriptor in USB. The present disclosure discusses systems and methods by which a device coupled to a host through a plug-and-play interface protocol may present a subset of capabilities among a plurality of capabilities based on a heuristic selection.

Figure 1:
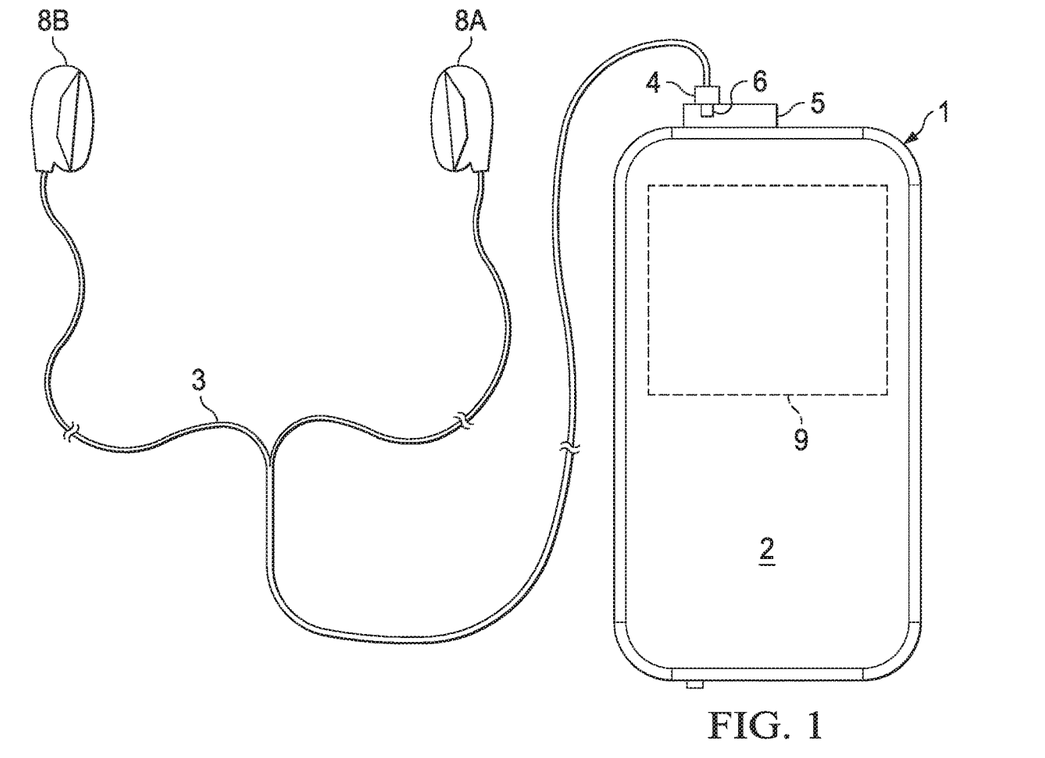
FIG. 1 is an illustration of an example personal audio device, in accordance with embodiments of the present disclosure.

FIG. 1 is an illustration of an example personal audio device 1, in accordance with embodiments of the present disclosure. Personal audio device 1 as depicted in FIG. 1 represents one of many types of devices that may operate as a host device for receiving a plug-and-play device. For instance, notebook computers, laptop computers, tablet computers, and desktop computers may also be examples of devices that may operate as a host device for receiving a plug-and-play device for purposes of this disclosure.

As shown in FIG. 1, personal audio device 1 may have coupled thereto a plug-and-play device 5, such as a USB adapter, for example. Plug-and-play device 5 may include a port 6 which serves as an electrical terminal for receiving one or more other peripheral devices, such that plug-and-play device 5 may serve as an interface between such one or more peripheral devices and personal audio device 1. As a non-limiting example, FIG. 1 depicts a headset 3 in the form of a pair of earbud speakers 8A and 8B, wherein headset 3 is coupled to personal audio device 1 via plug-and-play device 5. Headset 3 depicted in FIG. 1 is merely an example of a peripheral device, and it is understood that personal audio device 1 or any other suitable host may be used in connection with a variety of peripheral devices, including other audio devices (e.g., headphones, earbuds, in-ear earphones, and external speakers) or non-audio devices (optical devices, storage media, etc.). A plug 4 may provide for connection of headset 3 to port 6 of plug-and-play device 5. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include a processor 9 for controlling operation of personal audio device 1 and plug-and-play device 5 and headset 3 coupled thereto. As described in greater detail below, processor 9 may include or otherwise implement a plug-and-play device controller for managing plug-and-play device 5 and peripheral devices coupled thereto.

Figure 2:
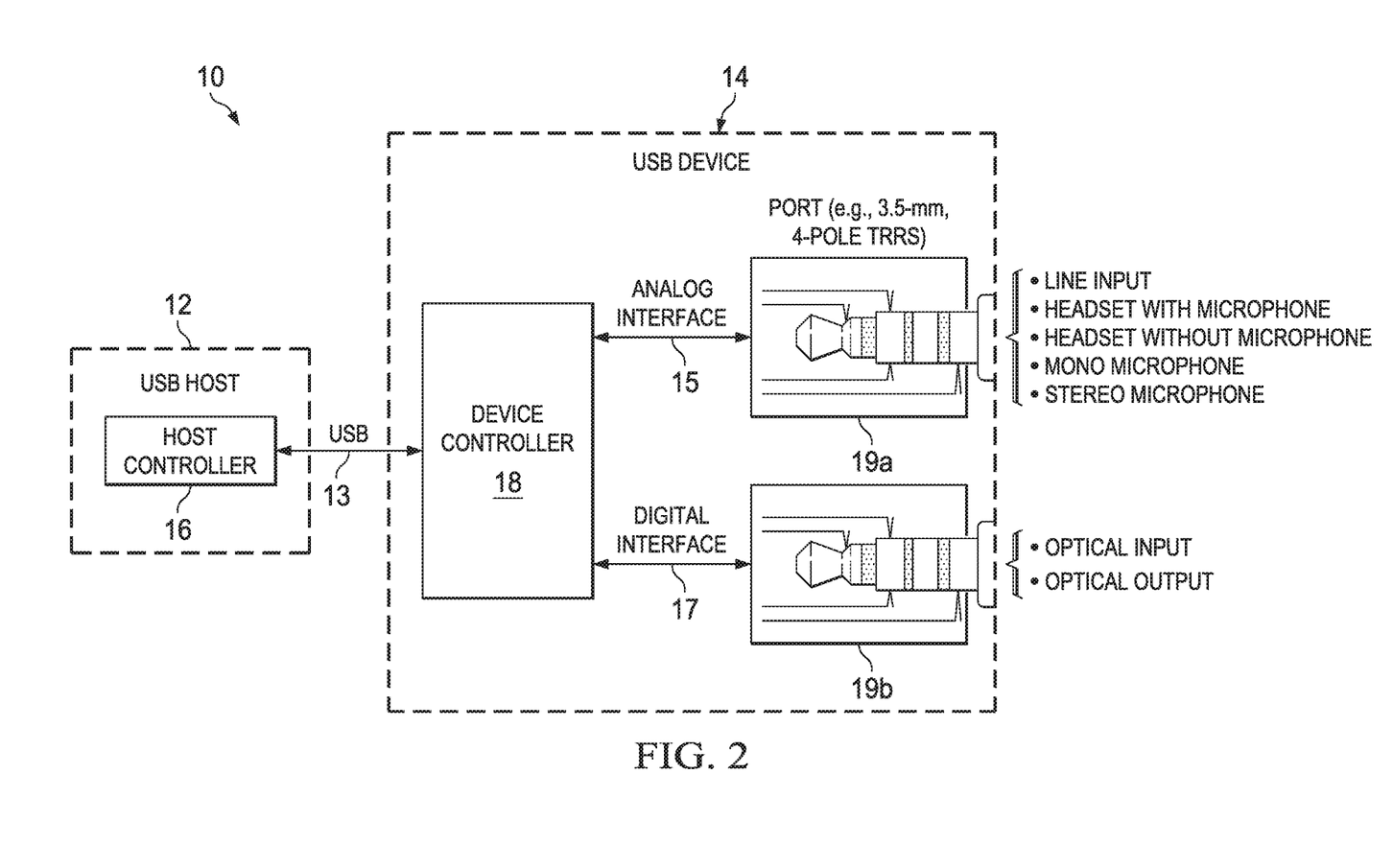
FIG. 2 illustrates an example system having a USB host and a USB device coupled via a USB bus, in accordance with embodiments of the present disclosure.

FIG. 2 illustrates an example system 10 having a USB host 12 and a USB device 14 coupled via a USB bus 13, in accordance with embodiments of the present disclosure. USB host 12 may be any suitable host device, including without limitation personal audio device 1 depicted in FIG. 1. As shown in FIG. 2, USB host 12 may include, among other components, a host controller 16, as is known in the art. Host controllers and their functionality for providing an interface between a host system and other devices are well-known in the art.

As depicted n FIG. 2, USB device 14 may include a device controller 18 and a plurality of ports 19 (e.g., port 19a and port 19b). As shown in FIG. 2, in some embodiments, one or more ports 19 may be implemented with a 3.5-mm, 4-pole Tip-Ring-Ring-Sleeve (TRRS) receptacle. A 3.5-mm TRRS connector may support many different analog and digital connections. For example, port 19a may comprise an analog port coupled to device controller 18 via an analog interface 15, and may support analog devices including, without limitation, a line input device, a headset with a microphone, a headset without a microphone, a mono microphone, and/or a stereo microphone. As another example, port 19b may comprise a digital port coupled to device controller 18 via a digital interface 17, and may support digital devices including, without limitation, an optical input device and an optical output device. Thus, the appropriate device capabilities of USB device 14 may depend on what peripheral devices are inserted into ports 19.

In operation, and as described in greater detail herein, device controller 18 may be configured to, when one of the different types of peripheral devices is received by one or more ports 19, obtain information related to a detection of the one of the different types of devices and, based on the information related to the detection, expose a subset of capabilities from the full set of capabilities of device controller 18 to bus 13, wherein the subset of capabilities is defined by the one of the different types of devices for the USB communication protocol. In some embodiments, device controller 18 may select the subset of capabilities from a pre-defined plurality of subsets of capabilities. In these and other embodiments, device controller 18 may define the subset of capabilities by a descriptor associated with USB device 14, as described in greater detail herein.

As also described in further detail herein, device controller 18 may be configured to, when no device is coupled to the one or more ports 19, decouple from bus 13 of USB protocol or other suitable communication protocol.

In these and other embodiments, device controller 18 may be configured to, responsive to an insertion of a peripheral device into a port 19 or removal of a peripheral device from a port 19, cause power to be removed from bus 13 and then reapplied. In these and other embodiments, device controller 18 may be configured to, responsive to an insertion of a device into a port 19 or removal of a device from a port 19, modify the subset of capabilities exposed to bus 13.

In some embodiments, as described in further detail herein, the communication protocol may be transmitted over a USB Type-C cable. In such embodiments, device controller 18 may be configured to, responsive to a high-impedance state on one or more signals of the communication protocol, cause USB device 14 to decouple from bus 13. In addition or alternatively, device controller 18 may be configured to, responsive to USB device 14 decoupling from bus 13 of the communication protocol, cause power to be removed from bus 13 and then reapplied.

While much discussion in this disclosure contemplates a USB host coupled via a USB interface to a USB device and communicating via a USB protocol, the methods and systems disclosed herein may also be applied to any other suitable type of host coupled to any suitable device via any suitable communication protocol interface and suitable communication protocol.

Figure 3:
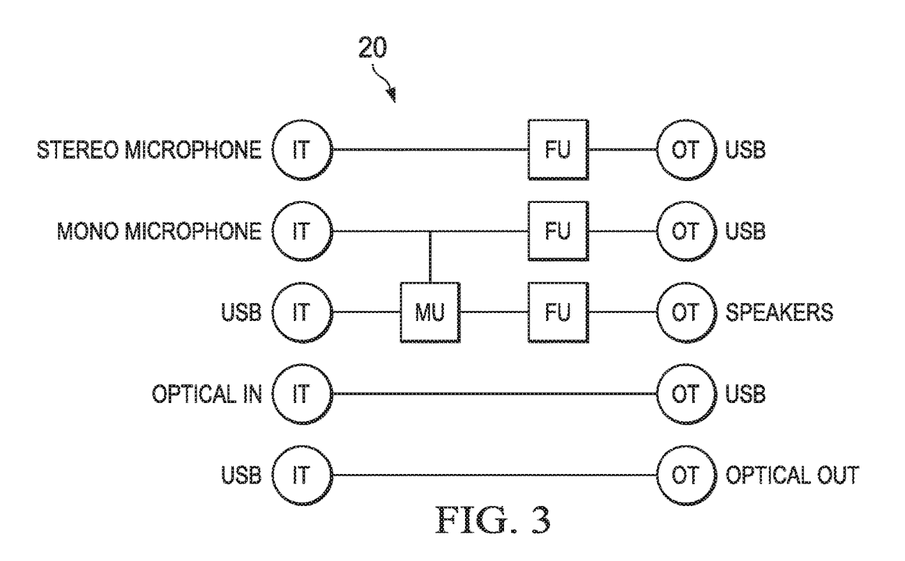
FIG. 3 illustrates a diagram of an example USB Audio Class topology for the full capability of the example USB device of FIG. 2, in accordance with embodiments of the present disclosure.

FIG. 3 illustrates a diagram of an example USB Audio Class topology 20 for the full capabilities of the example device 14 of FIG. 2, in accordance with embodiments of the present disclosure. As shown in FIG. 3, the USB protocol and USB Audio Class allow complex descriptions of the capabilities of USB device 14. In traditional approaches, when peripheral devices are plugged into ports (e.g., ports 19) of a USB device, the USB device may expose the full capabilities of the device to a USB host coupled via a USB bus to the USB device. However, because some capabilities of a USB device may be mutually exclusive, an optimum device implementation may not be able to support simultaneous operation of all capabilities despite the fact that all capabilities are reported.

To further illustrate, the device descriptor of topology 20 depicted in FIG. 3 shows that full capabilities of USB device 14 may include:
- a stereo microphone that is coupled to an input terminal (IT), wherein the input terminal is coupled to a feature unit (FU), and the feature unit is coupled to an output terminal (OT) that supports communication to a USB device;
- a mono microphone that is coupled to another input terminal, wherein such input terminal is coupled to another feature unit that is coupled to another output terminal that supports communication to a USB device;
- the input terminal for the mono microphone and another input for a USB device that is coupled to a mixer unit (MU), wherein the mixer unit is in turn coupled to another feature unit which is coupled to another output terminal that is coupled to speakers;
- an optical input device that is coupled via an input terminal to an output terminal for a USB device; and
- a USB device that is coupled via an input terminal to an output terminal for an optical output device.

Presenting of such full capabilities of a device (e.g., USB device 14) to a host (e.g., USB host 12) may involve great complexity and complication.

Figure 4:
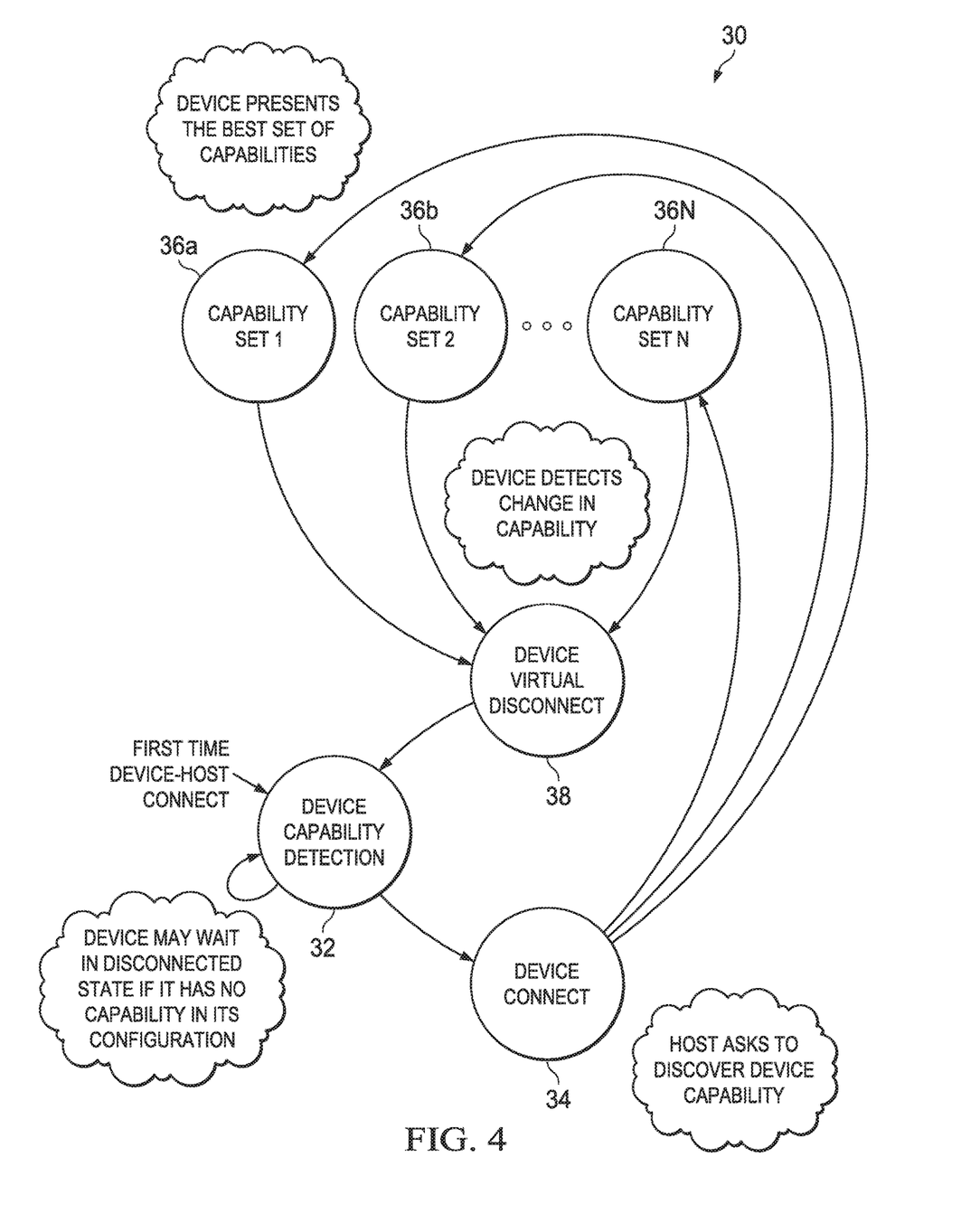
FIG. 4 illustrates an example state machine that may be executed by the device controller depicted in FIG. 2, in accordance with embodiments of the present disclosure.

FIG. 4 illustrates an example state machine 30 that may be executed by device controller 18, in accordance with embodiments of the present disclosure. By executing state machine 30, device controller 18 may expose a subset of its capabilities to a communication protocol (e.g., USB) instead of exposing its full set of capabilities. In some embodiments, the exposed subset may be an optimized or "best" set of capabilities based on one or more peripheral devices coupled to ports 19. Thus, device controller 18 may be capable of exposing dynamic device capability to bus 13.

In operation, state machine 30 may begin at device capability detection state 32 responsive to first detection of a connection between host device 12 and USB device 14. If such a connection is not detected, state machine 30 may wait at device capability detection state 32 or wait in another separate disconnected state if USB device 14 has no capability in its configuration.

After a device connection is detected, device controller 18 may transition state machine 30 to a device connect state 34. At device connect state 34, USB host 12 may request or ask to discover the capability of USB device 14. In response, device controller 18 may transition state machine 30 to a device capability exposure state 36 (e.g., one of states 36a, 36b, . . . , 36N based on determined capability), in which device controller 18 causes USB device 14 to present a subset (e.g., an optimized or "best" subset) of capabilities from its full set of capabilities. Device controller 18 may select the presented subset from a plurality of subsets of capabilities (e.g., capability set 1, capability set 2, . . . , capability set N). In some embodiments, the plurality of subsets of capabilities may include predefined subsets of capabilities. Once in a device capability exposure state 36, if device controller 18 detects a change in capabilities of USB device 14 (e.g., resulting from insertion or removal of a device to/from a port 19), device controller 18 may cause state machine 30 to transition to a device virtual disconnect state 38, in which device controller 18 may cause a virtual decoupling of USB device 14 from USB host 12 (e.g., causing power to be withdrawn and then reapplied to USB bus 13). After completion of device virtual disconnect state 38, device controller 18 may cause state machine 30 to proceed again to device capability detection state 32, wherein the process described above may repeat with respect to the newly-detected capabilities.

Figure 5:
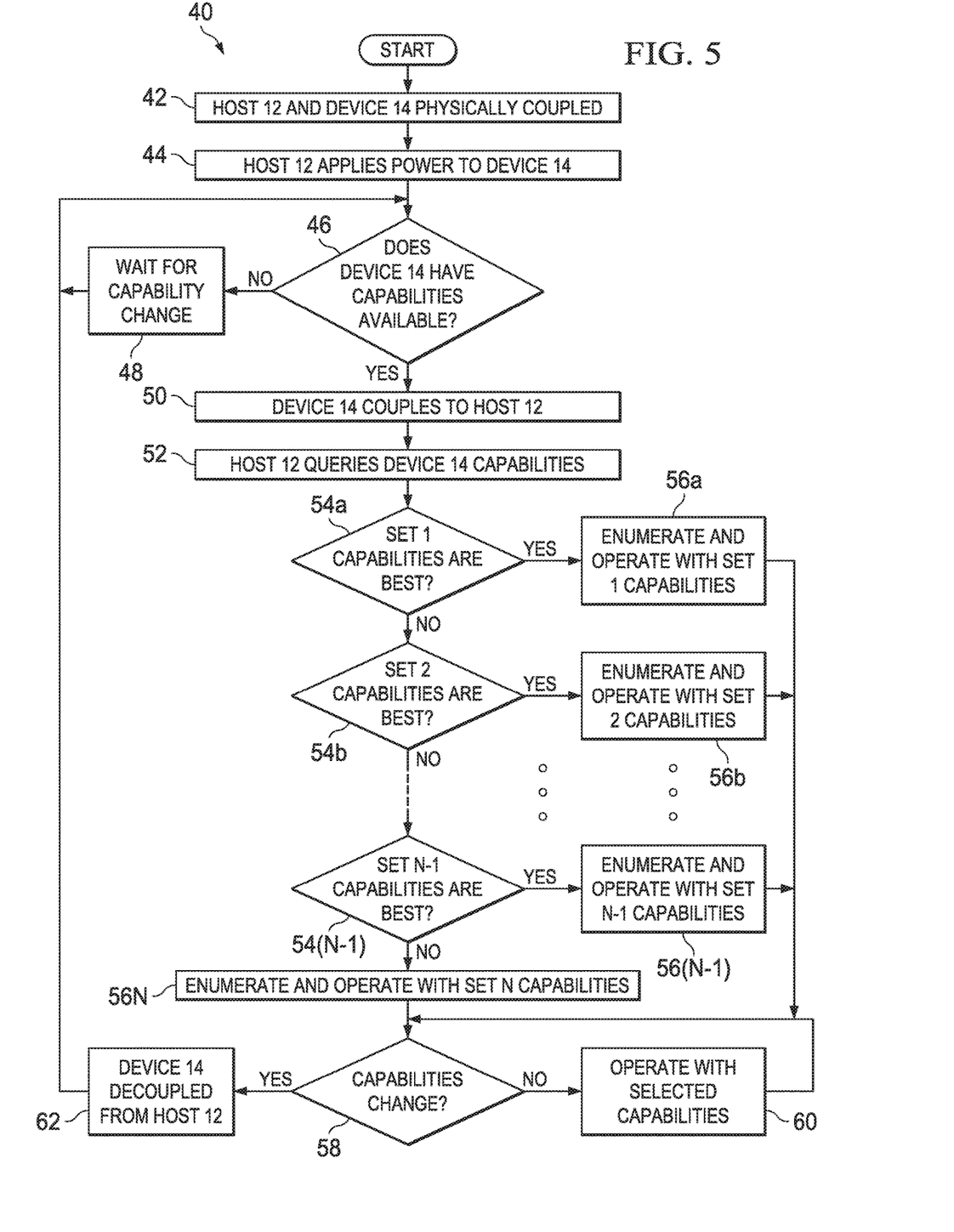
FIG. 5 illustrates a flow chart of an example method for exposing a subset of device capabilities to a bus of a communication protocol, in accordance with embodiments of the present disclosure.

FIG. 5 illustrates a flow chart of an example method 40 for exposing a subset of device capabilities to a bus (e.g., USB bus 13) of a communication protocol (e.g., USB), in accordance with embodiments of the present disclosure. Method 40 depicted in FIG. 5 may in some instances represent a method carried out by state machine 30 of FIG. 4. According to some embodiments, method 40 may begin at step 42. As noted above, teachings of the present disclosure may be implemented in a variety of configurations of system 10. As such, the preferred initialization point for method 40 and the order of the steps comprising method 40 may depend on the implementation chosen.

At step 42, USB host 12 and USB device 14 may be physically coupled to one another via USB bus 13. In response, at step 44, USB host 12 may apply power to USB device 14, thus facilitating operation of USB device 14. At step 46, device controller 18 may determine if USB device 14 has capabilities available. If USB device 14 has capabilities available, method 40 may proceed to step 50. Otherwise, if USB device 14 does not have capabilities available, method 40 may proceed to step 48.

At step 48, responsive to USB device 14 not having capabilities available, device controller 18 may wait for a change of capabilities of USB device 14, and then method 40 may proceed again to step 46.

At step 50, responsive to USB device 14 having capabilities available, device controller 18 may cause USB device 14 to communicatively couple to USB host 12 via bus 13. At step 52, USB host 12 may query USB device 14 for its capabilities.

After completion of step 52, one or more of steps 54 (e.g., steps 54a, 54b, . . . , 54(N−1)) may be executed to determine an optimal or "best" subset of capabilities, after which one of steps 56 (e.g., 56a, 56b, . . . , 56(N−1), 56N) may be executed to enumerate USB device 14 on bus 13 and expose the selected subset of capabilities.

At step 58, device controller 18 may determine if capabilities of USB device 14 have changed. Capabilities of USB device 14 may change, for example, as a result of coupling of a peripheral device to a port 19 and/or removal of a peripheral device from a port 19. If capabilities are unchanged, method 40 may proceed to step 60. Otherwise, if capabilities are changed, method 40 may proceed to step 62.

At step 60, responsive to capabilities of USB device 14 being unchanged, device controller 18 may continue to operate USB device 14 in accordance with the selected subset of capabilities. After completion of step 60, method 40 may proceed again to step 58, and steps 58 and 60 may repeat until the capabilities of USB device 14 are changed.

At step 62, responsive to capabilities of USB device 14 being changed, device controller 18 may cause USB device 14 to electrically decouple from bus 13 and USB host 12. After completion of step 62, method 40 may proceed again to step 46, after which device controller 18 may select another subset of capabilities to expose to bus 13.

Although FIG. 5 discloses a particular number of steps to be taken with respect to method 40, method 40 may be executed with greater or fewer steps than those depicted in FIG. 5. In addition, although FIG. 5 discloses a certain order of steps to be taken with respect to method 50, the steps comprising method 50 may be completed in any suitable order.

Method 40 may be implemented using device controller 18, components thereof, and/or any other system operable to implement method 40. In certain embodiments, method 40 may be implemented partially or fully in software and/or firmware embodied in computer-readable media.

Figure 6:
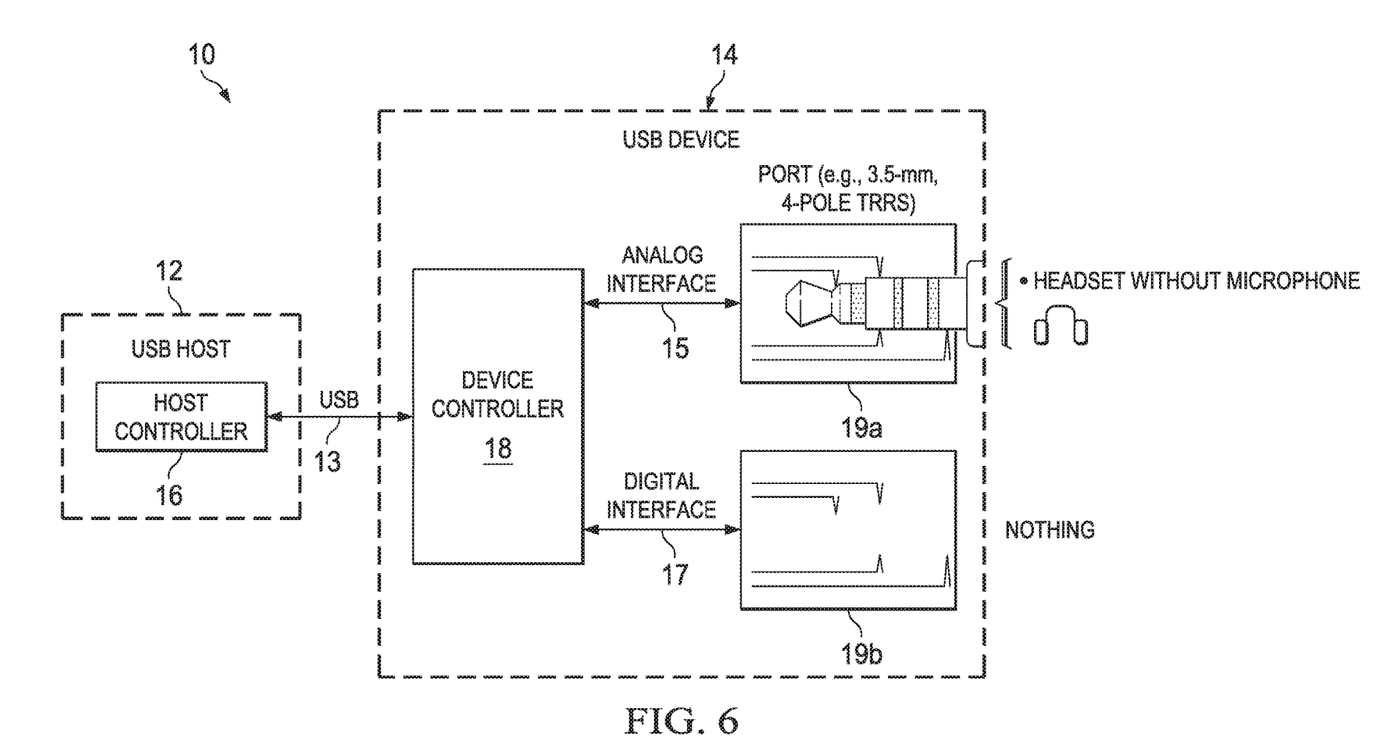
FIG. 6 illustrates the example system of FIG. 2 with a headset without microphone coupled to an analog port thereof, in accordance with embodiments of the present disclosure.

FIG. 6 illustrates example system 10 of FIG. 2 with a headset without microphone coupled to analog port 19a, in accordance with embodiments of the present disclosure. In response to the headset without microphone being coupled to analog port 19a, with no device coupled to digital port 19b, device controller 18 may expose a subset of capabilities to bus 13 based on the presence of the headset without microphone, as shown in FIG. 7.

Figure 7:
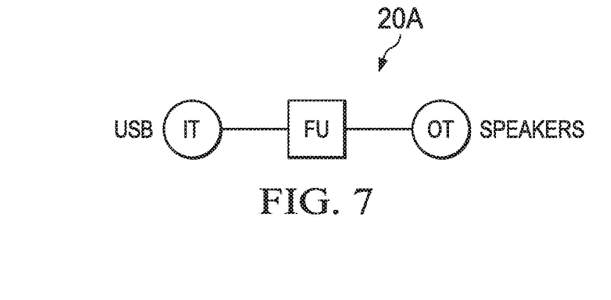
FIG. 7 illustrates an example device dynamic capability exposed to a bus by a device controller in response to a headset without microphone being coupled to an analog port of a USB device, in accordance with embodiments of the present disclosure.

FIG. 7 illustrates an example device dynamic capability 20A exposed to bus 13 by device controller 18 in response to a headset without microphone being coupled to analog port 19a, in accordance with embodiments of the present disclosure. Such device dynamic capability 20A may take the form of a descriptor (e.g., USB descriptor) defining a subset of capabilities exposed by USB device 14 to USB host 12 which is less complex than the full capability descriptor 20 of FIG. 3, and smaller in content (e.g., no microphone input is described in device dynamic capability 20A). In particular, as shown in FIG. 7, device controller 18 may expose a subset of capabilities including an input terminal that supports communication of a USB device wherein the input terminal is coupled to a feature unit and the feature unit is in turn coupled to an output terminal that supports output to speakers.

Figure 8:
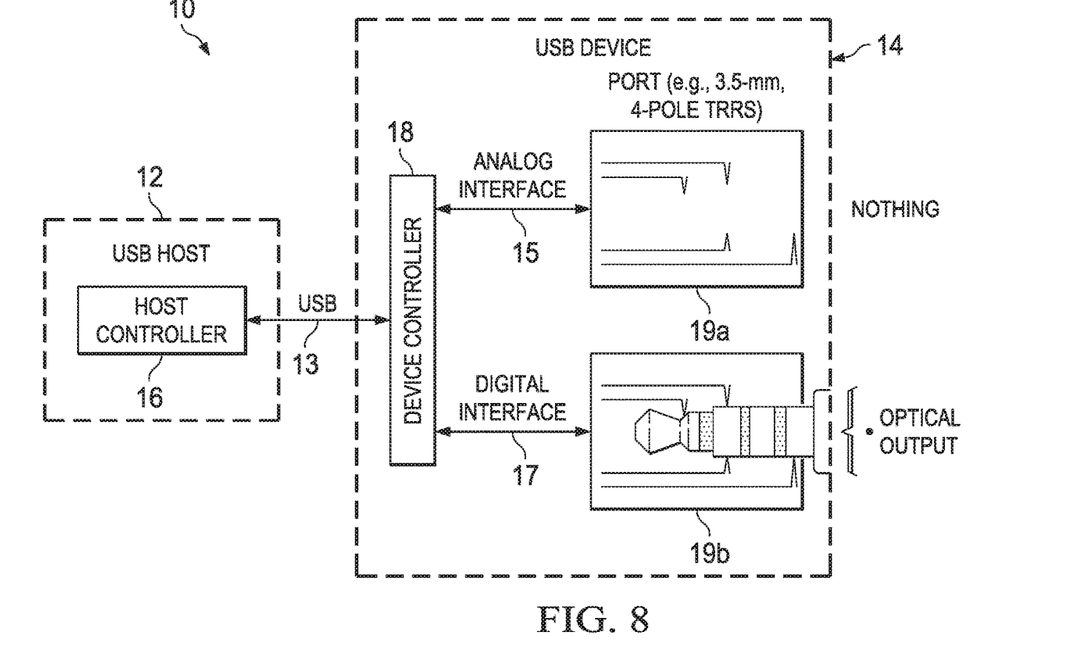
FIG. 8 illustrates the example system of FIG. 2 with an optical output device coupled to a digital port thereof, in accordance with embodiments of the present disclosure.

FIG. 8 illustrates example system 10 of FIG. 2 with an optical output device coupled to digital port 19b, in accordance with embodiments of the present disclosure. In response to the optical output device being coupled to digital port 19b, with no device coupled to analog port 19a, device controller 18 may expose a subset of capabilities to bus 13 based on the presence of the optical output device, as shown in FIG. 9.

Figure 9:
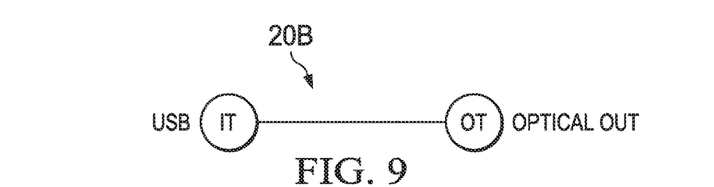
FIG. 9 illustrates an example device dynamic capability exposed to a bus by a device controller in response to an optical output device being coupled to a digital port of a USB device, in accordance with embodiments of the present disclosure.

FIG. 9 illustrates an example device dynamic capability 20B exposed to bus 13 by device controller 18 in response to the optical output device being coupled to digital port 19b, in accordance with embodiments of the present disclosure. Such device dynamic capability 20B may take the form of a descriptor (e.g., USB descriptor) defining a subset of capabilities by USB device 14 to USB host 12 which is less complex than the full capability descriptor 20 of FIG. 3, and smaller in content. In particular, as shown in FIG. 9, device controller 18 may expose a subset of capabilities including an input terminal that supports communication of a USB device wherein the input terminal is coupled to an output terminal that supports output to an optical output device.

Figure 10:
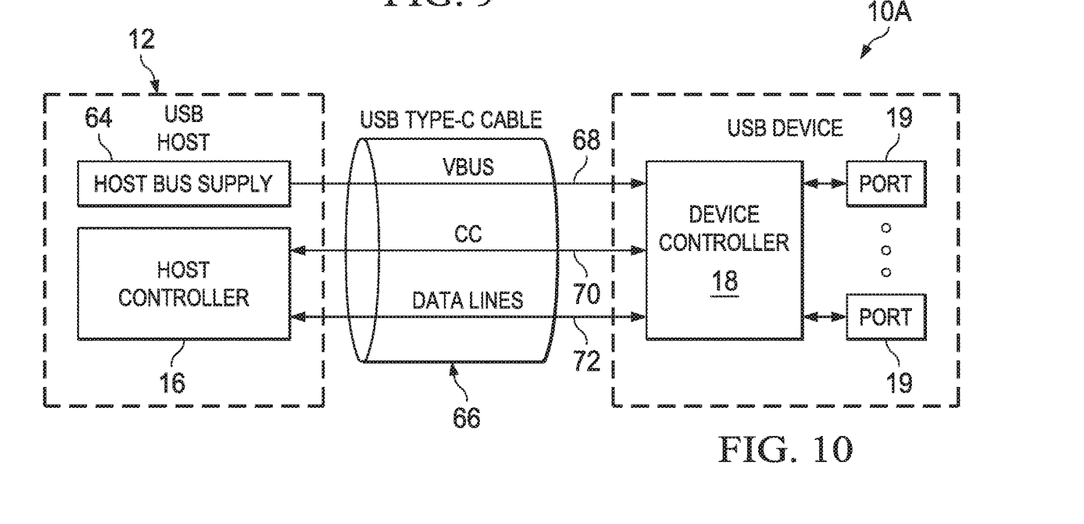
FIG. 10 illustrates an example system having a USB host and a USB device coupled via a USB bus implemented with a USB Type-C Cable, in accordance with embodiments of the present disclosure.

FIG. 10 illustrates an example system 10A having a USB host 12 and a USB device 14 coupled via a USB bus 13 implemented with a USB Type-C Cable 66, in accordance with embodiments of the present disclosure. As depicted in FIG. 10, USB host may include a host controller 16 and a host bus supply 64. As shown in FIG. 10, USB Type-C Cable 66 may be configured to carry a VBUS signal 68 supplied by host bus supply 64, a CC signal 70, and data signals 72.

Figure 11:
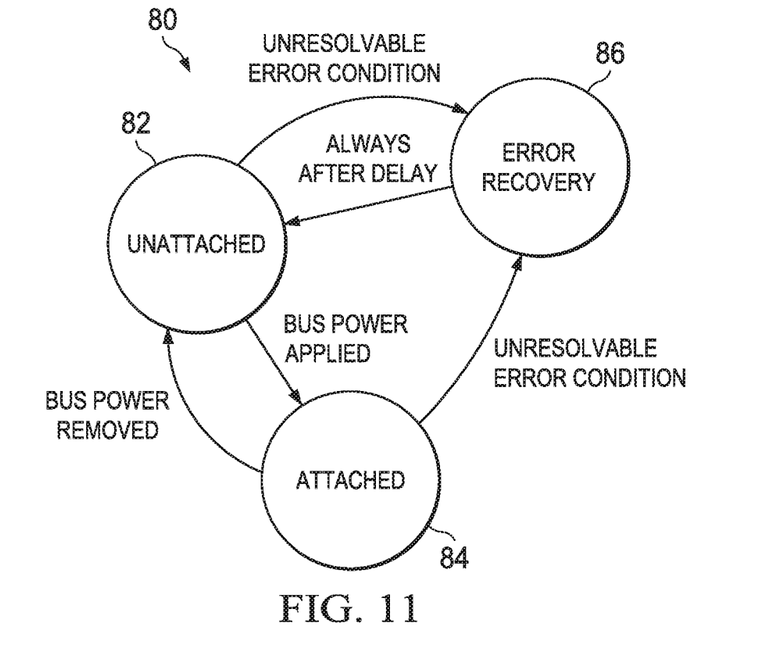
FIG. 11 illustrates an example state machine that may be executed by the device controller depicted in FIG. 10, in accordance with embodiments of the present disclosure.

FIG. 11 illustrates an example state machine 80 that may be executed by device controller 18 depicted in FIG. 10, in accordance with embodiments of the present disclosure. State machine 80 may represent a state diagram of a USB Type-C device port compliant to the USB Type-C specification. As shown in FIG. 11, state machine 80 may include an unattached state 82 in which device controller 18 may terminate CC signal 70 with a well-defined resistance or its equivalent. At unattached state 82, USB host 12 may, upon detecting termination of CC signal 70, enable the host bus voltage supply 64 causing device controller 18 to transition from unattached state 82 to the attached state 84. At attached state 84, device controller 18 may be required to terminate CC signal 70 with the well-defined resistance or its equivalent. Device controller 18 may transition from attached state 84 to unattached state 82 if and when bus power is removed on VBUS 68. The transition from attached state 84 to unattached state 82 is often understood in the relevant industry to mean that USB host 12 and USB device 14 have been physically disconnected either at the USB host-USB Type-C cable interface or at the USB Type-C cable-USB device interface. At either of attached state 84 or unattached state 82, device controller 18 may transition to an error recovery state 86 if an unresolvable error condition occurs. At error recovery state 86, device controller 18 may terminate CC signal 70 with a high-impedance to ground and after a minimum delay, state machine 80 may transition from error recovery state 86 to unattached state 82.

Figure 12:
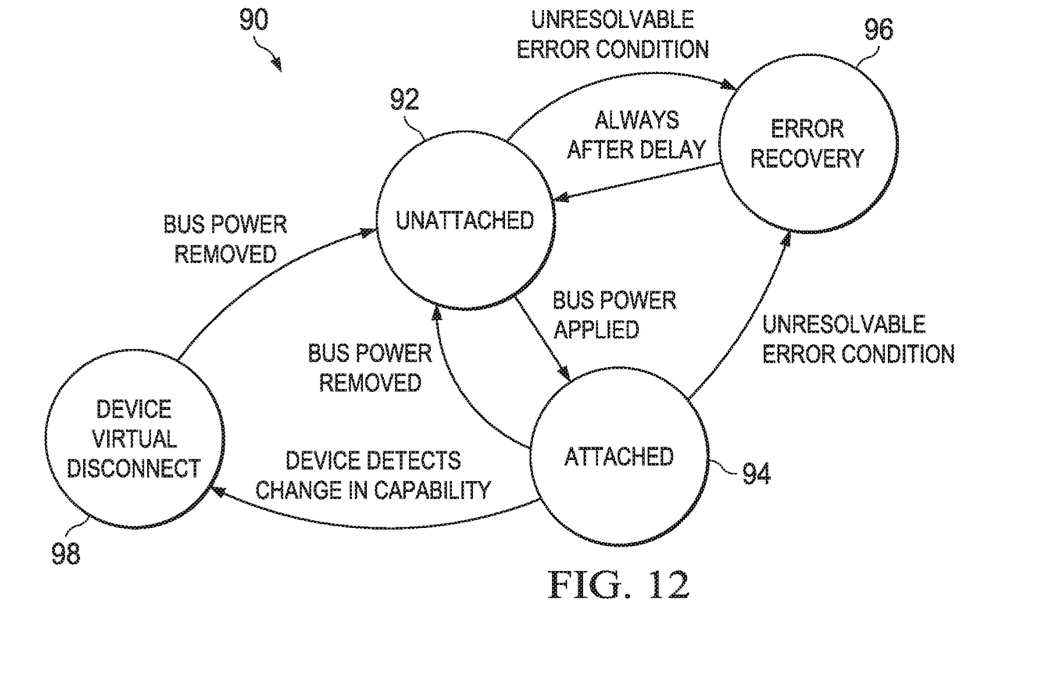
FIG. 12 illustrates another example state machine that may be executed by the device controller depicted in FIG. 10, in accordance with embodiments of the present disclosure.

FIG. 12 illustrates an example state machine 90 that may be executed by device controller 18 depicted in FIG. 10, in accordance with embodiments of the present disclosure. State machine 90 may represent a state diagram of a USB Type-C device port compliant to the USB Type-C specification. As shown in FIG. 12, unattached state 92 may behave identically or similarly to unattached state 82 of state machine 80, and error recovery state 96 may behave identically or similarly to error recovery state 86 of state machine 80. However, at attached state 94, device controller 18 may transition state machine 90 to one of unattached state 92, error recovery state 96, or a device virtual disconnect state 98. Transitions from attached state 94 to unattached state 92 may be similar or identical to transitions from attached state 84 to unattached state 82 of state machine 80, and transitions from attached state 94 to error recovery state 96 may be similar or identical to transitions from attached state 84 to error recovery state 86 of state machine 80. However, if device controller 18 detects a change in capability that requires a virtual disconnect, device controller 18 may transition state machine 90 from attached state 94 to device virtual disconnect state 98. At device virtual disconnect state 98, device controller 18 may terminate CC signal 70 with a high-impedance to ground. State machine 90 may exit device virtual disconnect state 98 and transition to unattached state 92 when bus power is removed.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An adapter configured to couple devices having different device types to a host system, the adapter comprising:
    one or more ports configured to receive the devices; and
    a device controller communicatively coupled to the one or more ports;
    wherein each of the different device types corresponds to a respective subset of capabilities from a full set of capabilities for a communication protocol; and
    wherein the device controller is configured to, when a particular device is received by one of the one or more ports:
        obtain information related to a detection of a particular device type of the particular device, wherein the particular device type corresponds to a particular subset of capabilities; and
        based on the information related to the detection, expose the particular subset of capabilities to a bus of the communication protocol by transmitting exactly one descriptor to the host system, wherein the exactly one descriptor corresponds to the respective subset of capabilities; and
    wherein the device controller is further configured to, responsive to an insertion of a device into or removal of a device from a port of the one or more ports while the bus is in a powered state:
        cause power to be removed from the bus and then reapplied with a modified subset of capabilities exposed to the bus such that the host system is configured to re-detect the adapter.

2. The adapter of claim 1, wherein the communication protocol is a Universal Serial Bus (USB) protocol.

3. The adapter of claim 1, wherein one of the one or more ports is an analog port.

4. The adapter of claim 3, wherein the particular device type corresponds to an analog device.

5. The adapter of claim 4, wherein the analog device comprises one of a line input device, a headset with a microphone, a headset without a microphone, a mono microphone, and a stereo microphone.

6. The adapter of claim 5, wherein the analog device is a headset without a microphone, and the particular subset of capabilities corresponds to:
    a Universal Serial Bus (USB) device coupled to an input terminal;
    the input terminal coupled to a feature unit;
    the feature unit coupled to an output terminal; and
    the output terminal coupled to speakers.

7. The adapter of claim 1, wherein one of the one or more ports is a digital port.

8. The adapter of claim 7, wherein the particular device type corresponds to a digital device.

9. The adapter of claim 8, wherein the digital device comprises one of an optical input device and an optical output device.

10. The adapter of claim 9, wherein the digital device is an optical output device and the particular subset of capabilities corresponds to:
    a Universal Serial Bus (USB) device coupled to an input terminal;
    the input terminal coupled to an output terminal; and
    the output terminal coupled to an optical output.

11. The adapter of claim 1, wherein if no device is coupled to the one or more ports, the device controller is configured to decouple from the bus of the communication protocol.

12. The adapter of claim 11, wherein the communication protocol is configured to be transmitted over a Universal Serial Bus (USB) Type-C cable.

13. The adapter of claim 12, wherein a high-impedance state on one or more signals of the communication protocol is configured to cause the device controller to decouple.

14. The adapter of claim 12, wherein the device controller is configured to, responsive to decoupling from the bus of the communication protocol, cause power to be removed from the bus and then reapplied.

15. The adapter of claim 1, wherein the respective subset of capabilities is selected from a pre-defined plurality of subsets of capabilities.

16. A method for use in an adapter configured to couple devices having different device types to a host system, each of the different device types corresponding to a respective subset of capabilities from a full set of capabilities for a communication protocol, wherein the adapter comprises one or more ports configured to receive the devices, and the adapter comprises a device controller communicatively coupled to the one or more ports, the method comprising:
    when a particular device is received by one of the one or more ports:
        obtaining information related to a detection of a particular device type of the particular device, wherein the particular device type corresponds to a particular subset of capabilities; and
        based on the information related to the detection, exposing the particular subset of capabilities to a bus of the communication protocol by transmitting exactly one descriptor to the host system, wherein the exactly one descriptor corresponds to the respective subset of capabilities;

wherein the device controller is further configured to, responsive to an insertion of a device into or removal of a device from a port of the one or more ports while the bus is in a powered state:

cause power to be removed from the bus and then reapplied with a modified subset of capabilities exposed to the bus such that the host system is configured to re-detect the adapter.

17. The method of claim 16, wherein the communication protocol is a Universal Serial Bus (USB) protocol.

18. The method of claim 16, wherein one of the one or more ports is an analog port.

19. The method of claim 18, wherein the particular device type corresponds to an analog device.

20. The method of claim 19, wherein the analog device comprises one of a line input device, a headset with a microphone, a headset without a microphone, a mono microphone, and a stereo microphone.

21. The method of claim 20, wherein the analog device is a headset without a microphone, and the particular subset of capabilities corresponds to:

a Universal Serial Bus (USB) device coupled to an input terminal;

the input terminal coupled to a feature unit;

the feature unit coupled to an output terminal; and the output terminal coupled to speakers.

22. The method of claim 16, wherein one of the one or more ports is a digital port.

23. The method of claim 22, wherein the particular device type corresponds to a digital device.

24. The method of claim 23, wherein the digital device comprises one of an optical input device and an optical output device.

25. The method of claim 24, wherein the digital device is an optical output device and the particular subset of capabilities corresponds to:

a Universal Serial Bus (USB) device coupled to an input terminal;

the input terminal coupled to an output terminal; and the output terminal coupled to an optical output.

26. The method of claim 16, further comprising, if no device is coupled to the one or more ports, decoupling the device controller from the bus of the communication protocol.

27. The method of claim 26, wherein the communication protocol is transmitted over a Universal Serial Bus (USB) Type-C cable.

28. The method of claim 27, further comprising causing the device controller to decouple responsive to a high-impedance state on one or more signals of the communication protocol.

29. The method of claim 27, further comprising responsive to decoupling from the bus of the communication protocol, causing power to be removed from the bus and then reapplied.

30. The method of claim 16, further comprising selecting the respective subset of capabilities from a pre-defined plurality of subsets of capabilities.

* * * * *